Patented Dec. 5, 1944

2,364,455

UNITED STATES PATENT OFFICE 2,364,455

PREPARATION OF ACETALS

Donald J. Loder, William F. Gresham, and Donald B. Killian, Wilmington, Del., assignors to E. I. du Pont de Nemours & Company, Wilmington, Del., a corporation of Delaware No Drawing. Application March 28, 1940,
Serial No. 326,427

5 Claims. (Cl. 260—484)

This invention relates to acetals and a process for their preparation and, more particularly, to the acetals of hydroxy carboxylic acids and production thereof by the interaction of aldehydes with hydroxycarboxylic acids or esters thereof.

An object of the present invention is to provide an improved process for the preparation of the formals and acetals of hydroxycarboxylic acids and their derivatives. A further object of the invention is to provide a process for the preparation of such acetals by the substitution of one or both of the alkyl groups of an acetal with an oxy acid group. Yet another object of the invention is to provide a process for the preparation of symmetrical acetals of hydroxycarboxylic acids and their esters by the interaction of an aldehyde, respectively, with hydroxy acids or their esters. Other objects and advantages of the invention will hereinafter appear.

Broadly, the process may be conducted by reacting, preferably under reflux, an aldehyde, and especially formaldehyde, in the presence or absence of an alcohol with hydroxy substituted organic carboxylic acids, their esters and acidic derivatives, the reaction being catalyzed, if desired, by an acidic catalyst. When the reaction has progressed to substantial completion, the catalyst, if any, is neutralized and the acetal produced, by-product alcohol, if any and other substituted products formed are removed by fractional distillation, whereby these materials are separated and the residue may be treated with additional aldehyde and catalyst and recycled.

The reaction is preferably conducted under reflux at one atmosphere pressure, although super- or sub-atmospheric pressures may be employed. The temperature of the reflux will, of course, be determined by the nature of the constituents being reacted and the pressure superimposed on the reactants. It will generally range between 20° and 180° C. Thus, by way of example, at one atmosphere, the reflux temperature for the reaction of formaldehyde and methanol with hydroxyacetic acid and its esters is the boiling temperature of the methylal-methanol azeotrope, 41.8° C., since this azeotrope, formed during the reaction, is the lowest boiling constituent of the mixture; in the reaction of formaldehyde and ethanol with the same acids or higher acids or their esters the temperature of reflux will be the boiling point of the acetal-ethanol azeotrope, 74.2° C.

It has been indicated that the reaction proceeds preferably in the presence of an acidic type catalyst. The catalyst may be, for example, sulfuric acid, paratoluenesulfonic acid, camphorsulfonic acid, hydrochloric acid or other acidic catalysts of this general character. Such catalysts should preferably be present in amounts ranging between 0.001 to 0.1 part thereof per part of the aldehyde reacted.

Due to the fact that the reaction involves fundamentally the interaction of two moles of the hydroxy-substituted organic acid per mole of the aldehyde, there should be employed, theoretically, to satisfy stoichiometric requirements, substantially these proportions of the aldehyde and the hydroxy-substituted organic acid. It has been found, however, that it is preferable to have the acid or ester present in greater excess, say between 2 to 8 moles thereof per mole of the aldehyde, and preferably between 3 to 5 moles of the acid or ester per mole of the aldehyde. In either case if an alcohol is present, it should be present in the ratio of 1 to 4 moles thereof per mole of the aldehyde, preferably, however, if the ester of glycolide is to be reacted, the molal ratio of alcohol to aldehyde should be approximately 2 to 1, while if the acid is to be reacted, the ratio should be approximately 3 to 1 on the same basis.

Generically, the reactions may be illustrated as proceeding in accord with the empirical equations:

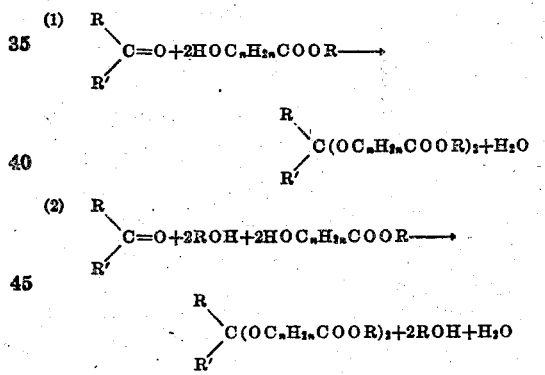

wherein R and R' are similar or dissimilar hydrogen or hydrocarbon radicals; and $n$ is an integer.

More specific examples are illustrated by the equations:

(3) $H_2CO + 2HOC_nH_{2n}COOH \rightarrow H_2C(OC_nH_{2n}COOH)_2 + H_2O$ (4) $CH_3CHO + 2HOC_nH_{2n}COOR \rightarrow CH_3CH(OC_nH_{2n}COOR)_2 + H_2O$ (5) $H_2CO + 2CH_3OH + 2HOCH_3COOH \rightarrow H_2C(OCH_3COOH)_2 + 2CH_3OH + H_2O$ Equation 3 illustrates the interaction, for example, of formaldehyde with hydroxyacetic acid to give a 1,1 di(carboxymethoxy) methane, $CH_2(OCH_2COOH)_2$; similarly, the acetals of the esters will be obtained in accord with Equation 4; and (5) illustrates specifically the preparation of di(carboxymethoxymethoxy) methane when methanol is present.

Examples will now be given illustrating preferred embodiments of the invention, but it will be understood that the invention is not restricted to the particular details thereof. The parts are by weight unless otherwise indicated.

*Example 1.*—2 moles of isobutyl glycolate, 2 moles of isobutanol, 1 mole of formaldehyde, and 0.1% concentrated sulfuric acid are reacted at a temperature of approximately 100° C. until equilibrium is substantially established. The acid catalyst is neutralized with a base, the isobutanol distilled off, and there is recovered a good yield of 1,1 di(carboisobutoxymethoxy) methane, $CH_2(OCH_2COOC_4H_9)_2$. This compound has a boiling point of 125 to 130° C. at 3 mm., a density at 25° C. of 1.2990 and a refractive index at 25° C. of 1.4292. It is a colorless mobile liquid not completely miscible with water but soluble in methanol, in isobutanol and isbutyl formal, and is a solvent for cellulose nitrate and a nonsolvent for chlorinated rubber.

*Example 2.*—82 parts of a partially dehydrated glycolic acid containing approximately 30% glycolic acid is reacted with approximately 125 parts of formaldehyde in the presence of approximately 290 parts methanol and 0.5 part of concentrated sulfuric acid. The reaction mixture is refluxed for from 3 to 5 hours, the acid catalyst is then neutralized with a base, the low-boiling material, (methylal-methanol-water) distilled off, and the residual product fractionally distilled, whereupon there is recovered methyl (methoxymethoxy) acetate and di(carbomethoxy-methoxy) methane, $CH_2(OCH_2COOCH_3)_2$, a water-white liquid which is substantially immiscible with water.

*Example 3.*—90 parts of methyl glycolate is mixed with 160 parts of formaldehyde, 340 parts of methanol, and approximately 4 parts of concentrated sulfuric acid. The reaction mixture is refluxed for several hours until equilibrium has been substantially established, the catalyst is then neutralized, and excess methylal distilled from the reaction mixture. Methyl (methoxymethoxy) acetate and di(carbomethoxymethoxy) methane is recovered in good yield from the reaction mixture.

The generic reaction given supra indicates that aldehydes broadly may be employed in the process of the invention, the examples illustrating the use primarily of formaldehyde. Other specific aldehydes which will react readily in accord with the invention are, for example, propanal, n-butanal, iso-butanal, and the higher straight and branched chain aldehydes.

In addition to hydroxyacetic acid and its esters, the use of which is illustrated in the examples, other hydroxy carboxylic acids, such as lactic acid, hydroxy butyric acid, citric acid, tartaric acid, and the like may be used as well as their esters, e. g., the methyl, ethyl, propyl, butyl, and higher esters of these acids. The alcohols which may be used if desired include, for example, methanol, ethanol, propanol, or the higher alcohols. The presence of an alcohol makes the reaction proceed more smoothly.

It has been found that the carboxyl group of the acetals of hydroxycarboxylic acids can be esterified, the hydrogen of the carboxyl group or groups being replaced by such alkyl groups as methyl, ethyl, n- and iso-propyl, and n- and iso-butyl, and the higher branch and straight chained alkyl groups; polyhydric alcohol esters and ether esters wherein the hydrogens are replaced by the hydroxy ethanol, alkoxy ethanol, (alkoxyalkoxy) ethanol, and the like may likewise be prepared. These esters may generally be made by simple esterification of the symmetrical acetals of the hydroxy acids with the appropriate alcohol or, in those cases where such acetals are relatively unstable in acid solution, it is preferable to effect the esterification by ester interchange of a lower alkyl ester of the acetal with an ester of the alcohol, the alkyl portion of which it is desired to substitute in place of the hydrogen of the carboxyl group or groups. Outstanding examples of such esters are di(carbomethoxymethoxy) methane, $$CH_2(OCH_2COOCH_3)_2$$

di(carbo-2-(methoxymethoxy)ethoxymethoxy) methane, $CH_2(OCH_2COOC_2H_4OCH_2OCH_3)_2$, and the higher alkyl esters of this formal.

Alternatively, these esters may be produced by the main process of the invention, namely, the interaction of an aldehyde with the appropriate ester of the hydroxycarboxylic acid.

The products of this invention are useful as solvents and plasticizers for cellulose acetate, propionate, nitrate, acetopropionate, ethyl cellulose, etc. in lacquer and film-flowing compositions, and in the preparation of similar compositions in which the natural and synthetic resins are used, such as, dammar, copal, urea-formaldehyde, phenol-formaldehyde, glyptal resins and the like. They may be reacted with polyhydric alcohols for the preparation of resins and with ammonia to form amines which may be subsequently polymerized. Moreover, they may be used as softeners for regenerated cellulose and as intermediates for the preparation of organic compounds.

We claim:

1. A process for the preparation of an acetal which comprises heating an aldehyde and an alcohol with a hydroxy-substituted organic compound in accord with the equation:

$$\begin{matrix}R\\ \phantom{xx}\diagdown\\ \phantom{xxxx}C=O + 2R'OH + 2HOC_nH_{2n}COOR \longrightarrow\\ \phantom{xx}\diagup\\ H\end{matrix}$$

$$\begin{matrix}R\\ \phantom{xx}\diagdown\\ \phantom{xxxx}C(OC_nH_{2n}COOR)_2 + 2R'OH + H_2O\\ \phantom{xx}\diagup\\ H\end{matrix}$$

in which R is a radical selected from the group consisting of hydrogen and hydrocarbon radicals, R' is a hydrocarbon radical and $n$ is an integer.

2. The process of claim 1 conducted with an acidic compound as the catalyst.

3. A process for the preparation of a formal of an alkyl hydroxycarboxylic acid which comprises heating formaldehyde and an aliphatic alcohol with an ester of a hydroxy-substituted organic acid in the presence of an acidic catalyst.

4. A process for the preparation of 1,1 di(carboisobutoxy methoxy) methane which comprises reacting 2 moles of isobutyl hydroxy-acetate and 2 moles of isobutanol with 1 mole of formaldehyde in the presence of 0.1% concentrated sulfuric acid as the catalyst, after equilibrium has been substantially established, neutralizing with a base and separating by distillation from the reaction product 1,1 di(carboisobutoxymethoxy) methane.

5. 1,1 di(carboisobutoxymethoxy) methane, $CH_2(OCH_2COOC_4H_9)_2$.

DONALD J. LODER.
WILLIAM F. GRESHAM.
DONALD B. KILLIAN.